United States Patent
Liao et al.

(10) Patent No.: US 12,344,543 B2
(45) Date of Patent: Jul. 1, 2025

(54) SEWAGE TREATMENT APPARATUS SUITABLE FOR SINGLE-FAMILY DOMESTIC SEWAGE TREATMENT

(71) Applicant: HUNAN WISDOM WATER ENVIRONMENTAL ENGINEERING CO., LTD., Changsha (CN)

(72) Inventors: Wenyun Liao, Changsha (CN); Mingjie Jiang, Changsha (CN); Yuting Lei, Changsha (CN); Lijuan Yi, Changsha (CN); Xingyang Liu, Changsha (CN)

(73) Assignee: Hunan Wisdom Water Environmental Engineering Co., LTD., Hunan (CN)

(*) Notice: Subject to any disclaimer, the term of this patent is extended or adjusted under 35 U.S.C. 154(b) by 731 days.

(21) Appl. No.: 17/418,655

(22) PCT Filed: Dec. 23, 2019

(86) PCT No.: PCT/CN2019/127391
§ 371 (c)(1),
(2) Date: Jun. 25, 2021

(87) PCT Pub. No.: WO2020/135322
PCT Pub. Date: Jul. 2, 2020

(65) Prior Publication Data
US 2022/0064040 A1    Mar. 3, 2022

(30) Foreign Application Priority Data
Dec. 25, 2018 (CN) .......................... 201811594402.3

(51) Int. Cl.
*B01D 21/00* (2006.01)
*B01D 21/24* (2006.01)
(Continued)

(52) U.S. Cl.
CPC ............ *C02F 9/00* (2013.01); *B01D 21/0012* (2013.01); *B01D 21/0042* (2013.01);
(Continued)

(58) Field of Classification Search
CPC .... C02F 9/00; C02F 1/001; C02F 1/28; C02F 1/32; C02F 1/50; C02F 1/78; C02F 3/30;
(Continued)

(56) References Cited

U.S. PATENT DOCUMENTS 3,706,384 A * 12/1972 Weijman-Hane .......................... B01D 21/0045
  210/522
2009/0001016 A1* 1/2009 Lee ........................ C02F 3/1263
  210/208
2017/0327395 A1* 11/2017 Lang ..................... C02F 3/1294

FOREIGN PATENT DOCUMENTS

CN    202519078 U    11/2012
CN    103570212 A *  2/2014
(Continued)

OTHER PUBLICATIONS

Wu, CN106007216 A., English machine translation (Year: 2016).*
(Continued)

*Primary Examiner* — Patrick Orme
(74) *Attorney, Agent, or Firm* — Calfee. Halter & Griswold LLP

(57) ABSTRACT

A sewage treatment apparatus comprises an external box body, the external box body is internally provided with a screen zone, an anaerobic and anoxic zone, an aerobic zone, a settling zone, an advanced treatment zone and a disinfection and sterilization zone communicating in sequence. The screen zone communicates with a household septic-tank through the pneumatic lifting apparatus, the aerobic zone communicates with the anaerobic and anoxic zone to reflux a part of mixed liquid to an anaerobic zone of the anaerobic
(Continued)

and anoxic zone, and the settling zone communicates with the anaerobic and anoxic zone to reflux a part of active sludge to an anoxic zone of the anaerobic and anoxic zone; and the sewage treatment apparatus further comprises an apparatus zone which is arranged independently and separately, and the apparatus zone is merely internally provided with an air compressor for providing a conveying pressure.

6 Claims, 4 Drawing Sheets

(51) Int. Cl.
*C02F 1/00* (2023.01)
*C02F 3/30* (2023.01)
*C02F 9/00* (2023.01)
C02F 1/28 (2023.01)
C02F 1/32 (2023.01)
C02F 1/50 (2023.01)
C02F 1/78 (2023.01)
C02F 101/10 (2006.01)
C02F 101/16 (2006.01)
C02F 101/34 (2006.01)

(52) U.S. Cl.
CPC ..... *B01D 21/0045* (2013.01); *B01D 21/2416* (2013.01); *B01D 21/2444* (2013.01); C02F 1/001 (2013.01); C02F 2001/007 (2013.01); C02F 1/28 (2013.01); C02F 1/32 (2013.01); C02F 1/50 (2013.01); C02F 1/78 (2013.01); C02F 3/30 (2013.01); C02F 2101/101 (2013.01); C02F 2101/16 (2013.01); C02F 2101/34 (2013.01); C02F 2203/006 (2013.01); C02F 2303/02 (2013.01); C02F 2303/04 (2013.01); C02F 2303/16 (2013.01)

(58) Field of Classification Search
CPC .......... C02F 2001/007; C02F 2101/101; C02F 2101/16; C02F 2101/34; C02F 2203/006; C02F 2303/02; C02F 2303/04; C02F 2303/16; C02F 3/301; C02F 1/283; C02F 3/1242; B01D 21/0012; B01D 21/0042; B01D 21/0045; B01D 21/2416; B01D 21/2444; Y02W 10/10; Y02W 10/37
See application file for complete search history.

(56) References Cited

FOREIGN PATENT DOCUMENTS

| | | | | |
|---|---|---|---|---|
| CN | 104671317 A | | 6/2015 | |
| CN | 105668740 A | | 6/2016 | |
| CN | 105668849 A | * | 6/2016 | ............... C02F 1/42 |
| CN | 106007216 A | * | 10/2016 | |
| CN | 206089362 U | * | 4/2017 | |
| CN | 106865893 A | * | 6/2017 | ............... C02F 9/00 |
| CN | 108079763 A | * | 5/2018 | |
| CN | 108164045 A | * | 6/2018 | |
| CN | 108310905 A | * | 7/2018 | |
| CN | 108911354 A | * | 11/2018 | ............... C02F 9/00 |
| CN | 108911361 A | * | 11/2018 | |
| CN | 109467282 A | | 3/2019 | |
| CN | 209368075 U | | 9/2019 | |
| EP | 0396142 A1 | | 11/1990 | |
| WO | WO-0228786 A2 | * | 4/2002 | ......... B01D 61/025 |
| WO | WO-2012167486 A1 | * | 12/2012 | ......... B01D 21/0045 |

OTHER PUBLICATIONS

Ma, CN106865893 A, English machine translation (Year: 2017).*
He, CN206089362 U, English machine translation (Year: 2017).*
Gao, CN103570212 A., English machine (Year: 2014).*
Hunan, CN108911361 A, English machine translation (Year: 2018).*
Wang, CN108079763 A, English machine translation (Year: 2018).*
Hu, CN108310905 A., English machine translation (Year: 2018).*
Liu, CN105668849A, English machine translation (Year: 2016).*
Wang 2, CN108911354 A, English machine translation (Year: 2018).*
Zhang, WO2012167486 A1, English machine translation (Year: 2012).*
Lei, CN108164045 A, English machine translation (Year: 2018).*
International Search Report of PCT/2019/127391 dated Mar. 18, 2020.

* cited by examiner

SEWAGE TREATMENT APPARATUS SUITABLE FOR SINGLE-FAMILY DOMESTIC SEWAGE TREATMENT

CROSS-REFERENCE TO RELATED APPLICATIONS

This application is a 371 of PCT Application No. PCT/CN2019/127391 filed on Dec. 23, 2019, which claims priority to Chinese Application No. 201811594402.3 filed on Dec. 25, 2018, the contents of which are hereby incorporated by reference as if recited in their entirety.

TECHNICAL FIELD

The present invention relates to the technical field of sewage treatment apparatuses, in particular to a sewage treatment apparatus suitable for single-household domestic sewage treatment.

BACKGROUND

In recent years, processes of industrialization and urbanization are accelerated, the vigor for industrial distribution and economic structural adjustment is increased, it is weak to monitor the living environment, policies are lagged behind relatively, and industrial pollution and urban living pollution are increased rapidly. Although there is a multi-household sewage treatment apparatus mounting scheme in the current market as far as areas which cannot be covered by a municipal sewage collecting pipe network are concerned, the multi-household sewage treatment apparatus mounting scheme has the problems of large size, low effluent index control rate and poor generalization performance. Furthermore, as an existing centralized sewage treatment apparatus cannot be popularized to each family to be mounted independently and cannot meet a household using demand and a small group using demand, it is hard to achieve comprehensive treatment of single-household sewage.

SUMMARY

The present invention provides a sewage treatment apparatus suitable for single- and multi-household domestic sewage treatment to solve the technical problem that an existing sewage treatment apparatus cannot meet single-household domestic sewage treatment.

According to one aspect of the present invention, the present invention provides a sewage treatment apparatus suitable for single-household domestic sewage treatment, the sewage treatment apparatus being used for integrated treatment of domestic sewage discharged by a single residence. The sewage treatment apparatus includes a pneumatic lifting apparatus for lifting domestic sewage.

including an external box body, wherein the external box body is internally provided with a screen zone, an anaerobic and anoxic zone, an aerobic zone, a settling zone, an advanced treatment zone and a disinfection and sterilization zone communicating in sequence, the screen zone communicates with a household septic tank through the pneumatic lifting apparatus, the aerobic zone communicates with the anaerobic and anoxic zone to reflux a part of mixed liquid to an anaerobic zone of the anaerobic and anoxic zone, and the settling zone communicates with the anaerobic and anoxic zone to reflux a part of active sludge to an anoxic zone of the anaerobic and anoxic zone; and the sewage treatment apparatus further comprising an apparatus zone which is arranged independently and separately, the apparatus zone being merely internally provided with an air compressor for providing a conveying pressure.

Further, the screen zone is internally provided with a drawer type screen, the drawer type screen being a drawer box by four side plates and a bottom plate and provided with an opening; and the bottom plate is provided with an intercepting hole for intercepting a suspended pollutant and a colloidal pollutant, a bore diameter of the intercepting hole being 1-10 mm.

Further, a top of the anaerobic and anoxic zone is provided with a deodorization device, the deodorization device comprising a shell, a protecting layer for preventing water in the anaerobic zone from entering the shell, a physical adsorption layer for physically adsorbing odor floating upwards in the anaerobic zone, a heating assembly for thermal desorption and regeneration of the physical adsorption layer and an exhaust valve for discharging gas adsorbed by the physical adsorption layer to an atmosphere; and the shell is hermetically connected with the anaerobic zone, a bottom of the shell is provided with a ventilating channel, the protecting layer and the physical adsorption layer are received in the shell, the protecting layer is located at the bottom of the shell, the physical adsorption layer is located above the protecting layer, and the exhaust valve is arranged on a top of the shell.

Further, the settling zone is provided with a water distributing apparatus for distributing water uniformly, and the water distributing apparatus includes a water guide pipe perpendicularly arranged or vertically and obliquely arranged for introducing a water flow into a bottom of the settling zone and a water distributing pipe located in the bottom of the settling zone and horizontally arranged for distributing water uniformly;

an upper end of the water guide pipe communicates with a water inlet pipeline and a lower end of the water guide pipe communicates with the water distributing pipe; and the water distributing pipe is uniformly provided with a plurality of water distributing holes that are spaced from each other uniformly, and separation distance between adjacent water distributing holes is 20-100 mm.

Further, the advanced treatment zone is provided with a water advanced treatment apparatus, wherein the water advanced treatment apparatus includes a box body, an upper portion of the box body being provided with a water inlet and a water outlet; and the box body is internally provided with a vertical flow settling assembly for guiding a fluid vertically introduced from the water inlet and outputting the fluid in an ejecting manner by way of inclined wall reflection and an inclined tube settling assembly or a sloping plate settling assembly arranged in an output position of the vertical flow settling assembly and used for settling the fluid output by the vertical flow settling assembly in an inclined settling manner.

Further, the water outlet of the box body is provided with a sand filter layer and/or a carbon filter layer;

or an inner wall surface of an upper portion of the box body is provided with a ring of water channel, the water channel is internally provided with the sand filter layer/or the carbon filter layer, and a bottom position of the water channel is lower than the position of the water outlet.

Further, the inclined tube settling assembly includes at least two supporting pipes and a plurality of inclined tubes arranged in parallel; and the at least two supporting pipes are in fastening connection with an inner wall of the box body, and the plurality of inclined tubes are positioned in the box body through the at least two supporting pipes.

Further, the water inlet at a lower end of the inclined tube is provided with a partition plate for dividing the water inlet into an upper flow port and a lower flow port, the water inlet at a lower end of the inclined tube is further provided with a lower guide plate for guiding the water flow to flow into the inclined tube from the upper flow port, and an end, far away from the water inlet, of the partition plate is provided with an upper guide plate for guiding separated silt to flow out from the lower flow port.

Further, a vertical flow settling assembly comprises a center barrel and a rebounding piece connected with each other;

the water flow is introduced into an upper portion of the center barrel and the rebounding piece is arranged at a lower end of the center barrel; and the rebounding piece is provided with at least one bevel located in a water flow falling direction.

Further, the disinfection and sterilization zone is internally provided with an ultraviolet disinfector and/or an ozone sterilizer.

The present invention has the beneficial effects that the sewage treatment apparatus suitable for single-household domestic sewage treatment integrates the anaerobic zone, the aerobic and anoxic zone, the aerobic zone, the settling zone, the advanced treatment zone and the disinfection and sterilization zone in the external box body to establish an efficient integrated household sewage treatment system in the external box body, and it is only needed to mount a water inlet pipe and a water outlet pipe. A mounting mode that a conventional sewage treatment device is buried outdoors far away from residences is changed, and the sewage treatment apparatus has the advantages of being incapable of generating odors, low in noise, small in occupied area and low in power consumption. The effluent quality after treatment by the sewage treatment apparatus can meet a first grade standard A of Pollutant Discharge Standard of Municipal Sewage Treatment Plant GB18918-2002. In addition, the sewage treatment apparatus can be mounted in every family indoors to improve the household sewage treatment of the single residence, so that the sewage discharge and water quality of the region are further improved.

Besides the abovementioned purposes, characteristics and advantages, the present invention further has other purposes, characteristics and advantages. Further detailed description of the present invention will be made below with reference to drawings.

BRIEF DESCRIPTION OF THE DRAWINGS

The drawings constituting a part of the disclosure are to provide further understanding of the present invention. The schematic embodiment and description thereof are used for explaining the present invention and do not limit the present invention improperly. In the drawings.

DESCRIPTION OF THE DRAWINGS 11, screen zone, 12, anaerobic and anoxic zone, 13, aerobic zone, 14, settling zone, 15, advanced treatment zone, 16, disinfection and sterilization zone. 111, drawer box, 112 side plate, 113, bottom plate, 1131, intercepting hole, 1121, lifting handle, 121, shell, 122, protecting layer, 123, physical adsorption layer, 125, heating assembly, 126, exhaust value, 1211, handle, 141, water guide pipe, 142, water distributing pipe, 1421, water distributing hole, 151, box body, 152, vertical flow settling assembly. 153, inclined tube settling assembly, 1513, water channel, 1515, slope, 1521, center barrel, 1522, rebounding piece, 1531, supporting pipe, 1532, inclined tube, 1533, partition plate, 1534, upper flow port, 1535, lower flow port, 1536, lower guide plate, 1537, upper guide plate, 131, aeration main pipe, 132, aeration branch pipe, 133, aeration hose, 134, sleeve, 135, fixed bracket, 136, supporting rack.

DETAILED DESCRIPTION

Detailed description is made on the embodiments of the present invention below in combination with drawings. However, the present invention can be implemented by various different modes defined and covered below.

Figure 1:
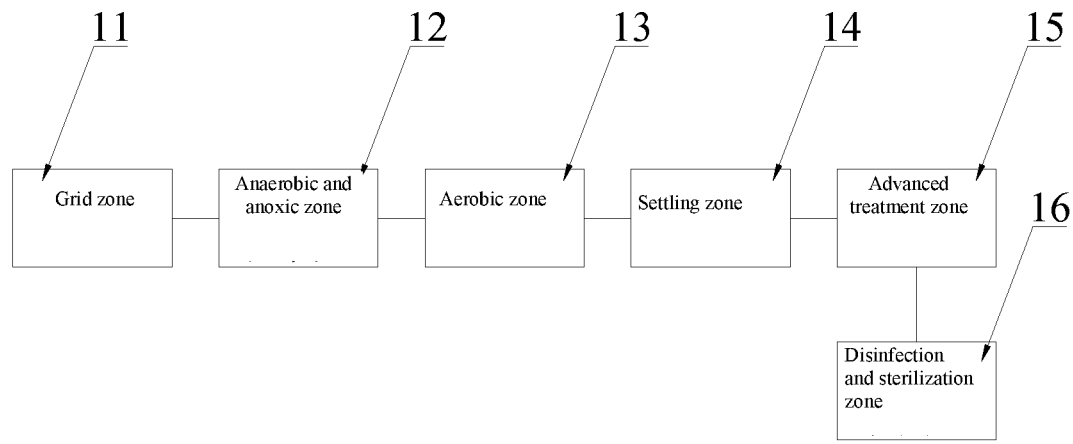
FIG. 1 is a structural schematic diagram of modules of the sewage treatment apparatus suitable for single-household domestic sewage treatment of a preferred embodiment of the present invention.

As shown in the FIG. 1, the preferred embodiment of the present invention provides a sewage treatment apparatus suitable for single-household domestic sewage treatment for integrated treatment of household sewage discharged by a single residence, thereby playing a role of purifying sewage, and the effluent quality is stable. The sewage treatment apparatus is in an integrated structure design and includes an external box body, wherein the external box body is internally provided with a screen zone 11, an anaerobic and anoxic zone 12, an aerobic zone 13, a settling zone 14, an advanced treatment zone 15, a disinfection and sterilization zone 16 and an apparatus zone communicating in sequence, the zones are separated and communicate via a pipeline, the screen zone 11 communicates with a household septic tank, the screen zone 11, the anaerobic and anoxic zone 12, the aerobic zone 13, the settling zone 14, the advanced treatment zone 15 and the disinfection and sterilization zone 16 communicate in sequence, the aerobic zone 13 communicates with the anaerobic and anoxic zone 12 to reflux a part of mixed liquid to an anaerobic zone of the anaerobic and anoxic zone 12, and the settling zone 14 communicates with the anaerobic and anoxic zone 12 to reflux a part of active sludge to an anoxic zone of the anaerobic and anoxic zone 12. The household sewage discharged by the single residence treated by the household septic tank is introduced into the screen zone 11 via the gas stripping device, and the screen zone 11 can intercept the suspended pollutants and the colloid pollutants in the household sewage to prevent the pipeline from being blocked and the load of a treatment unit from being increased subsequently. The effluent in the screen zone 11 is discharged to the anaerobic and anoxic zone 12, the anaerobic and anoxic zone 12 can degrade and decompose organic matters in the household sewage by means of microbial active sludge, wherein the anaerobic and anoxic zone 12 is divided into multi-grid structures to ensure that the sewage can be in full contact reaction with the microbial active sludge within an effective standing time. The effluent of the anaerobic and anoxic zone 12 is discharged to the aerobic zone 13, the aerobic zone 13 is internally provided with filler and an aeration system, the sewage in the aerobic zone 13 is subjected to a sufficient biochemical reaction, and part of mixed liquid formed by sufficient reaction of the sewage in the aerobic zone 13 flows into the settling zone 14, and meanwhile, part of mixed liquid is returned to the anaerobic zone via a mixed liquid return pipe to manufacture the anaerobic environment in the anaerobic and anoxic zone 12. The settling zone 14 can distribute water and settle the mixed liquid uniformly, the effluent in the settling zone 14 flows into the advanced treatment zone 15, and meanwhile, the settling zone 14 further refluxes a part of activated sludge to the anaerobic zone of the anaerobic and anoxic zone 12. The advanced treatment zone 15 conducts advanced treatment on sewage by adopting a filter mode of multilayered multiple media, and the effluent of the advanced treatment zone 15 passing through the disinfection and sterilization zone 16 reaches the standard to be discharged. The apparatus zone is arranged independently and separately, and the apparatus zone is merely internally provided with an air compressor for providing a conveying pressure. The air compressor is provided with a liquid crystal operating screen, and the apparatus zone is merely provided with one air compressor, such that the power consumption is quite small. It can be understood that the gas stripping device is further used for sludge refluxing, mixed liquid refluxing and backflushing of the filter system. It can be understood that the disinfection and sterilization zone 16 can further disinfect clean water discharged from the advanced treatment zone 15, thereby further guaranteeing that the effluent quality of the sewage treatment apparatus of the present invention meets the discharge standard. The disinfection and sterilization zone 16 is internally provided with an ultraviolet disinfector and/or an ozone sterilizer. The anaerobic and anoxic zone 12 includes the anaerobic zone and the anoxic zone, the anaerobic zone communicates with the screen zone 11 and the anoxic zone communicates with the anaerobic zone and the aerobic 13 respectively.

The sewage treatment apparatus suitable for single-household domestic sewage treatment integrates the anaerobic zone 11, the aerobic and anoxic zone 12, the aerobic zone 13, the settling zone 14, the advanced treatment zone 15 and the disinfection and sterilization zone 16 to establish an efficient integrated household sewage treatment system, and it is only needed to mount a water inlet pipe and a water outlet pipe. A mounting mode that a conventional sewage treatment device is buried outdoors far away from residences is changed, and the sewage treatment apparatus has the advantages of being incapable of generating odors, low in noise, small in occupied area and low in power consumption.

Figure 2:
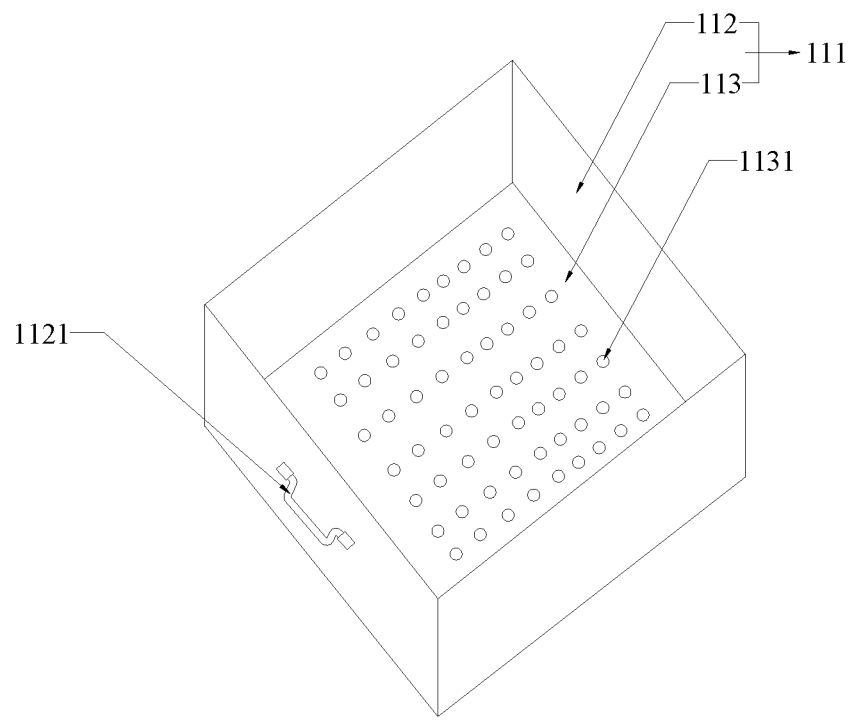
FIG. 2 is a structural schematic diagram of the drawer type grating of the screen zone in the FIG. 1 of the preferred embodiment of the present invention.

As shown in the FIG. 2, the screen zone 11 is provided with the draw type screen which includes a drawer box 111 spliced by four side plates 112 and a bottom plate 113 and provided with an opening, the bottom plate 113 is provided with an intercepting hole 1131 for intercepting suspended pollutants and colloidal pollutants, the bore diameter of the intercepting hole 1131 is 1-10 mm, preferably 1-5 mm, so that the suspended pollutants and colloidal pollutants can be intercepted effectively, and only pollutants in a dissolved state are allowed to pass. It can be understood that in some specific embodiments of the present invention, the bore diameter of the intercepting hole 1131 further can be 1 mm, 2 mm, 5 mm or 8 mm. The intercepting holes 1131 are uniformly formed at intervals in the bottom plate 113, and the intercepting holes 1131 are in shapes of round holes, square holes, rhombic holes, triangular holes, elliptical or other irregular shapes. Preferably, at least one of the four side plates 112 is provided with the lifting handle 1121 convenient to lift the screen with hands. It can be understood that preferably, the separation distance between adjacent intercepting holes 1131 is 2-10 mm, preferably, 2-5 mm, and the separation distance between adjacent intercepting holes is the distance between hole walls of the adjacent intercepting holes 1131. It can be understood that a length of the drawer type screen is 0.5-5 m, preferably 0.5-2 m, and a width is 0.5-5 m, preferably 0.5-2 m.

The drawer type screen includes the drawer box 111 spliced by four side plates 112 and the bottom plate 113 and provided with the opening, the bottom plate 113 is provided with the intercepting holes 1131 for intercepting suspended pollutants and colloidal pollutants, the bore diameters of the intercepting holes 1131 are 1-10 mm, so that the suspended pollutants and colloidal pollutants can be intercepted effectively, and it is convenient to assemble and disassemble the drawer type screen and remove filter residues deposited in the screen, and it is quite convenient to operate.

It can be understood that preferably, the four side plates 112 are connected and spliced end to end in sequence to form a square frame, and the bottom plate 113 is slidably connected with the square frame. Specifically, the bottom plate 113 is provided with a protrusion, the two oppositely arranged side plates 112 are provided with grooves, and the bottom plate 113 is matched with the square frame via the protrusion and the grooves to achieve relative slide. When the intercepting holes 1131 in the bottom plate 113 are blocked, only the bottom plate 113 is detached to clean or the bottom plate 113 is replaced. It can be further understood that the protrusion is arranged on the top surface of the bottom plate 113 and the grooves are formed in the bottom surface of the water channel 112. As a deformation, two oppositely arranged side plates 112 of the square frame are provided with protrusions, and the bottom plate 113 is provided with the groove. Or, the bottom plate 113 is rotatably connected with the square frame. specifically, one end of the bottom plate 113 is in rotating shaft type connection or hinge with a side plate 112 of the square frame, the other end opposite to the bottom plate 113 and the side plate 112 opposite to the square frame are positioned by a bolt, and when it is needed to clean the bottom plate 113 periodically, it is only needed to pull out the bolt and rotate the bottom plate 113.

It can be understood that preferably, the bottom plate 113 is provided with the filter layer, and the filter layer can not only be arranged on a water inlet surface of the bottom plate 113, but also be arranged on a water outlet surface of the bottom plate 113 or the filter layers are arranged on the water inlet surface and the water outlet surface of the bottom plate 113 simultaneously. The filter layer can be one or more of a sand filter layer, a carbon filter layer, a carbon screen layer, a porous ceramic layer or a non-woven fabric layer, wherein the sand filter layer can remove particulate matters in the sewage preliminarily and the carbon filter layer can adsorb grease in the sewage. The drawer type screen of the present invention can improve the water quality of the sewage preliminarily by arranging the filter layer on the bottom plate 113, thereby reducing the subsequent load of the sewage treatment unit. Further preferably, the bottom plate 113 is further provided with the lifting handle 1121 convenient to lift the screen with hands.

It can be understood that preferably, the bottom plate 113 is arranged obliquely. As the sewage flows in from the opening of the drawer type screen ordinarily, the flowing direction of the sewage is substantially vertical to the screen. The vertically flowing sewage is of a certain impact force. If the bottom plate 113 is arranged horizontally, the vertically flowing sewage may push through the intercepting holes 1131 directly to pass through and flow out to a next treatment step, and the intercepting effect of the intercepting holes 1131 is discounted. The bottom plate 113 is arranged obliquely, such that the vertically flowing sewage flushing the bottom plate 113 and does not push through the intercepting holes 1131 directly, but flows down along a bevel of the bottom plate 113 and is then intercepted by the intercepting holes 1131. The inclination angle of the bottom plate 113 is 10-30 degrees, preferably 15-20 degrees. When the inclination angle of the bottom plate 113 is in the range, an effective intercepting effect can be exerted, and the water flow can be prevented from impacting the bottom plate 113 to splash.

It can be further understood that preferably, at least one of the four side plates 112 is provided with a guide plate inclining toward the inner cavity of the screen, the guide plate is located below a sewage influx port, and the flowing sewage drained by the inclined guide plate reduces the influx speed and impact force of the sewage, thereby further guaranteeing that the intercepting holes 1131 can play an effective intercepting role. The inclination angle of the guide plate is 40-60 degrees, preferably 45-60 degrees. When in the inclination angle of the guide plate is within the range, a draining effect can be exerted effectively and the sewage can be prevented from splashing out of the screen.

It can be understood that as a deformation, the drawer type screen is of a multilayered stacked structure, each layer includes the drawer box 111 spliced by four side plates 112 and one bottom plate 113 and provided with the opening, and the bottom plate 113 is provided with the intercepting holes 1131, such that multilayered interception can be conducted, thereby further playing an intercepting role. The multilayered stacked structure herein includes at least two layers.

Figure 3:
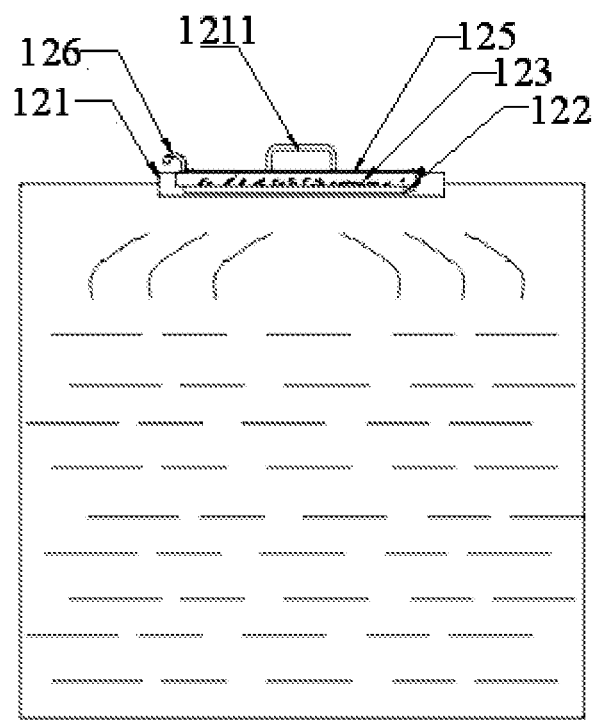
FIG. 3 is a schematic diagram of a deodorization device arranged on the top of the anaerobic and anoxic zone in the FIG. 1 of the preferred embodiment of the present invention.

As shown in the FIG. 3, the top of the anaerobic and anoxic zone 12 is provided with the deodorization device for adsorbing and removing gas with odors such as hydrogen sulfide, ammonia gas and fatty acids generated by the sludge in an anaerobic digestion process. It can be understood that the deodorization device and the anaerobic zone jointly form a relatively tight space, and only being deodorized by the deodorization device, can gas in the anaerobic zone be discharged to the atmosphere. The deodorization device includes the shell 121, the protecting layer 122, the physical adsorption layer 123, the heating assembly 125 and the exhaust valve 126, wherein the protecting layer 122 is used for preventing water in the anaerobic zone from entering the shell 121, the physical adsorption layer 123 is used for physically adsorbing odor floating upwards in the anaerobic zone, the heating assembly 125 is used for thermal desorption and regeneration of the physical adsorption layer 123 and the exhaust valve 126 for discharging gas adsorbed by the physical adsorption layer 123 to the atmosphere. The shell 121 is hermetically connected with the anaerobic zone, the protecting layer 122 and the physical adsorption layer 123 are accommodated in the shell 121, the bottom of the shell 121 is provided with a ventilating channel to introduce odors generated in the anaerobic zone into the shell 121, the protecting layer 122 is located at the bottom of the shell 121, the physical adsorption layer 123 is arranged on the protecting layer 122, the heating assembly 125 is arranged on the shell 121, and the exhaust valve 126 is arranged on the top of the shell 121 and is located in a position of the physical adsorption layer 123. It can be understood that the ventilating channel at the bottom of the shell 121 can be a vent hole or the bottom of the shell 121 is hollowed out. Odors generated in the anaerobic zone are introduced into the shell 121 through the vent hole in the bottom of the shell 121, pass through the protecting layer 122 and then are adsorbed by the physical adsorption layer 123, and are discharged to the atmosphere via the exhaust value 126. It can be understood that an adsorption material in the physical adsorption layer 123 is activated carbon and the activated carbon can adsorb the odors physically. It can be further understood that pore structures of the activated carbon are mesoporous and macroporous structures mainly, the average bore diameter is 1.5 mm-2.5 nm, preferably 1.5 mm-2 nm, and when the average bore diameter of the porous structure of the activated carbon is within the range, the physical adsorption layer 123 is optimum in physical adsorption effect. The heating assembly 125 is a solar panel which can absorb light energy to heat the physical adsorption layer 123, thereby achieving the thermal desorption and regeneration process of the activated carbon. It can be understood that the heating assembly 125 can be arranged in the shell 121 and the shell 121 in the position of the heating assembly 125 is transparent, and at the moment, the heating assembly 125 is arranged on two sides or around the physical adsorption layer 123. It can be understood that the protecting layer 122 is a semi-transparent film or the protecting layer 122 is a platy piece which is provided with small holes with bore diameters of which being 0.1-0.6 mm, preferably 0.1-0.5 mm. The protecting layer 122 only allows odors floating upwards in the anaerobic zone to enter the shell 121 and blocks sewage in the anaerobic zone out of the shell 121, so as to prevent the sewage from entering the shell 121 to damage an activated carbon adsorption structure of the physical adsorption layer 123 and/or to damage the heating assembly 125.

According to the deodorization device of the present invention, the odors floating upward in the anaerobic zone passes through the protecting layer 122 first, the protecting layer 122 can prevent the sewage in the anaerobic zone from entering the shell 121, the odors physically adsorbed by the physical adsorption layer 123 are then discharged to the atmosphere, the adsorption material of the physical adsorption layer 123 is subjected to thermal desorption and regeneration by the heating assembly 125, the physical adsorption layer 123 can be repeatedly used and still has a good adsorption effect even if being used for a long time, and it is not needed to replace the adsorption material of the physical adsorption layer 123 periodically, such that the operating cost is lowered.

It can be understood that the deodorization device and the anaerobic zone are fixedly connected or detachably connected, wherein detachable connection can be buckling connection, threaded fastening connection, magnetic suction connection or interference fit connection and the like. The shell 121 is further provided with the handle 1211 for the convenience of lifting. Specifically, the handle 1211 is arranged on the top of the shell 121. When the deodorization device is detached from the anaerobic zone, it is convenient to lift the deodorization device with hands.

It can be understood that preferably, the deodorization device further includes an exhaust gas treatment apparatus (not shown in the drawing), and the exhaust gas treatment device is used for cleaning exhaust gas generated by thermal desorption and regeneration of the physical adsorption layer 123 to achieve harmless emission of exhaust gas. When the heating assembly 125 absorbs solar energy to heat the physical adsorption layer 123, the activated carbon in the physical adsorption layer 123 realizes thermal desorption and regeneration, and exhaust gas generated in the thermal desorption and regeneration process is introduced into the exhaust gas treatment device via the exhaust valve 126 and is then cleaned and discharged to the atmosphere. For example, the exhaust treatment device is a photocatalytic device which realizes harmless emission of the exhaust gas through photocatalytic decomposition.

It can be understood that preferably, the deodorization device further can realize functions of automatic detection and gas discharge control. The deodorization device further includes the controller and the detection device. The exhaust valve 126 is an electromagnetic valve, both the exhaust valve 126 and the detection device are connected with the controller, and the controller is further connected with the heating assembly 125 to control the heating assembly 125 to start work. The detection apparatus can detect components of gas adsorbed by the physical adsorption layer 123 and feed the detection result back to the controller. Content threshold values of various gas components are preset in the controller according to the discharge standard. When the controllers makes a comparison that the gas components adsorbed by the physical adsorption layer 123 meet the discharge standard, the controller controls the exhaust valve 126 to open and the adsorbed gas is discharged to the atmosphere via the exhaust valve 126. When the controller makes a comparison that the gas components adsorbed by the physical adsorption layer 123 do not the discharge standard, it is verified that the adsorption effect of the physical adsorption layer 123 is reduced greatly and odors cannot be adsorbed physically well. The controller controls the exhaust valve 126 to close, and controls the heating assembly 125 to start work. The activated carbon in the physical adsorption layer 123 is subjected to thermal desorption and regeneration and the exhaust valve 126 communicates with the exhaust gas treatment apparatus, the controller controls the exhaust valve 126 to open, and the exhaust gas generated by thermal desorption and regeneration of the physical adsorption layer 123 and gas in the anaerobic zone are introduced into the exhaust gas treatment apparatus and are discharged to the atmosphere after being cleaned. It can be understood that the controller can be a PLC or an MCU, and the detection device is a gas analyzer. The deodorization device of the present invention can achieve automatic detection and intelligent discharge of odors via the detection device and the controller, thereby ensuring that the deodorization device has a good deodorization effect.

It can be understood that as a deformation, the heating assembly 125 further can be an electric heating plate or an electric heating tube (not shown in the drawings) for heating the physical adsorption layer 123, the electric heating plate or the electric heating tube is arranged above the physical adsorption layer 123, the electric heating plate can further heat the physical adsorption layer 123 and cooperates with the heating assembly 125 to accelerate the thermal desorption and regeneration process of the physical adsorption layer 123.

Figure 4:
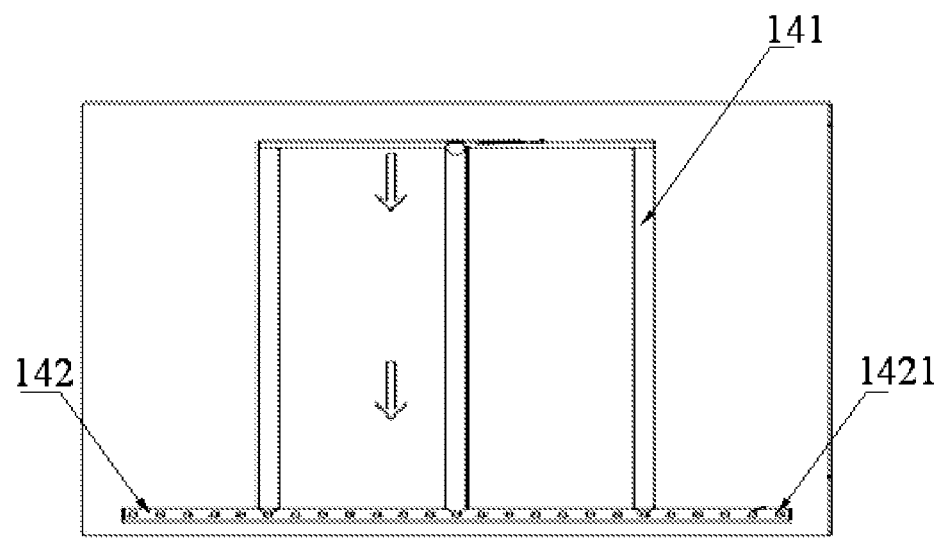
FIG. 4 is a schematic diagram of the water distributing device arranged on the settling zone in the FIG. 1 of the preferred embodiment of the present invention.

As shown in the FIG. 4, the settling zone 14 is internally provided with the water distributing device for introducing a water flow into the settling zone 14 to uniformly distribute water, the water distributing device includes a water guide pipe 141 for guiding an influent the bottom of the settling zone 14 and a water distributing pipe 142 located at the bottom of the settling zone 14 and arranged horizontally, the upper end of the water guide pipe 141 communicates with the aerobic zone 13 via a water inlet pipeline, the lower end of the water guide pipe 141 communicates with the water distributing pipe 142, the water distributing pipe 142 is uniformly provided with a plurality of water distributing holes 1421 at intervals, and the bore diameters of the water distributing holes 1421 are 5-20 mm, preferably 10-15 mm. When the bore diameters of the water distributing holes are within the range, the water distributing pipe 142 has the optimum water distributing effect, and the water distributing pipe 142 is hardly blocked. It can be understood that the separation distance between adjacent water distributing holes 1421 is 20-100 nm, preferably, 50-100 nm and when the separation distance between adjacent water distributing holes 1421 is within the range, the water distributing pipe has the optimum uniform water distributing effect. It can be understood that the separation distance between adjacent water distributing hoes 1421 is a distance between hole walls of adjacent holes. It can be understood that the water guide pipe 141 is perpendicularly or vertically and obliquely arranged in the settling zone 14, preferably, perpendicularly arranged. It can be further understood that the number of the water distributing pipes 141 is multiple to increase the water inlet amount and improve the water distributing efficiency. It can be understood that the water distributing pipe 142 can be further replaced by a water distributing plate. It can be further understood that a position where the water guide pipe 141 communicates with the water inlet pipeline is provided with a water inlet amount control valve, such that the water inlet amount can be controlled precisely. The water distributing pipe 142 is preferably a flexible pipe. It can be further understood that preferably, the water distributing pipe 142 is internally provided with a sleeve, the sleeve is provided with a through hole or is internally provided with an arc-shaped control panel, and an actual water outlet bore diameter of the water distributing hole 1421 can be adjusted by matching the through hole with the water distributing hole 1421 or the gap between the arc-shaped control panel and the water distributing hole 1421, such that the water outlet flow of the water distributing hole 1421 is controlled. When the water inlet amount is small, the actual water outlet bore diameter of the water distributing hole 1421 is reduced as the gap between the arc-shaped control panel and the water distributing hole 1421 can be reduced or the matching degree of the through hole in the sleeve and the water distributing hole 1421 is adjusted, thereby ensuring a very good uniform water distributing effect still when the water inlet amount is small.

According to the water distributing device, the influent is guided to the bottom of the settling zone 14 through the water guide pipe 141 perpendicularly arranged or vertically or obliquely arranged, water is distributed uniformly through the water distributing holes 1421 uniformly formed at intervals in the water distributing pipe 142 horizontally arranged at the bottom, the bore diameters of the water distributing holes 1421 are 5-20 mm, the water distributing pipe 142 has a better water distributing effect, the water distributing pipe 142 is hardly blocked, the separation distance between the adjacent water distributing holes 1421 is 20-100 mm, and the water distributing device has the optimum uniform water distributing effect.

It can be understood that preferably, the water distributing device further includes a catch basin (not shown in the drawing) arranged on the inner wall of the top of the settling zone 14 and used for improving the influent buffer capacity. The catch basin communicates with the water inlet pipe, the upper end of the water guide pipe 141 communicates with the catch basin, and when the water inlet amount of the water inlet pipeline is increased suddenly, the influent buffered by the catch basin is then introduced into the water guide pipe 141, such that the buffer capacity of the water distributing device coping with a large flow load is improved. Further preferably, a position where the catch basin communicates with the water guide pipe 141 is provided with a filter layer (not shown in the drawing), and the filter layer can filter the influent to improve the water quality introduced into the settling zone 14. The filter layer is one or more of the sand filter layer, the carbon filter layer, the fiber screen layer, the non-woven fabric layer and a metal filter screen.

It can be understood that preferably, a plurality of water distributing pipes 142 are arranged uniformly at intervals at the bottom of the aerobic zone 14. The plurality of water distributing pipes 142 are arranged in parallel or in a screen manner. Specifically, the water distributing pipes 142 include a plurality of first water distributing pipes arranged uniformly at intervals along the horizontal X direction and a plurality of second water distributing pipes arranged uniformly at intervals along the horizontal Y direction, the second water distributing pipes communicate with the first water distributing pipes, at least one of the first and second water distributing pipes communicates with the water guide pipe 141, and the first and second water distributing pipes are uniformly provided with water distributing holes 1421 at intervals. By arranging the plurality of first and second water distributing pipes, the uniform water distributing effect of the water distributing device is further improved.

It can be understood that preferably, the length of the water guide pipe 141 can be adjusted, such that the water guide pipe can be suitable for water treatment apparatus with different heights of the settling zone 14. Specifically, the water guide pipe 141 is of a retractable structure formed by connecting a plurality of pipe bodies. Adjacent two pipe bodies can slide relatively along an axial direction to be positioned, such that the axial length of the water guide pipe 141 can be adjusted. The length of the water guide pipe 141 can be adjusted, such that the water guide pipe can be suitable for water treatment apparatus with different heights of the settling zone 14, thereby having the advantage of wide application range.

It can be understood that preferably, the water distributing device further includes an air inlet pipe (not shown in the drawing) communicating with the water guide pipe 141. When the water distributing holes 1421 in the water distributing pipe 142 are blocked, inflow from the water guide pipe 141 is stopped, and then the air inlet pipe communicates with an external air supply device to blow the water guide pipe 141 and the water distributing pipe 142 so as to blow blocking impurities in the water distributing holes 1421, thereby prolonging the service life of the water distributing device. It can be further understood that a part of pipe section of the water distributing pipe 142 is provided with a valve, such that the part of pipe section of the water distributing pipe 142 can be closed selectively, and then the blocked water distributing holes 1421 are dredged by way of blowing, influxion, suction or backflushing and the like.

It can be further understood that preferably, two ends of the water distributing pipe 142 are further connected with flushing pipes, and positions where the water distributing pipe 142 is connected to the flushing pipes are provided with flushing valves. When the water distributing holes 1421 in the water distributing pipe 142 are blocked, inflow from the water guide pipe 141 is stopped, the flushing pipes communicate with the external water supply apparatus, then the flushing valves are opened, the water distributing pipe 142 is back-flushed by means of a high speed water flow introduced by the flushing pipes to flush the blocking impurities in the water distributing holes 1421, thereby prolonging the service life of the water distributing device. It is quite convenient to operate.

It can be understood that preferably, the water distributing pipe 142 can rotate relative to the water guide pipe 141 so as to achieve a rotary water distributing effect, thereby further improving the uniform water distributing effect of the water distributing device. Specifically, the water distributing pipe 142 is connected with the water guide pipe 141 through a rotatable joint, then a rotating mechanism is arranged to drive the water distributing pipe 142 to rotate relative to the water guide pipe 141, and the rotating mechanism can be a four connecting rod rotating mechanism, a cam type rotating mechanism, a hinge type rotating mechanism or a spiral rotating mechanism.

Figure 5:
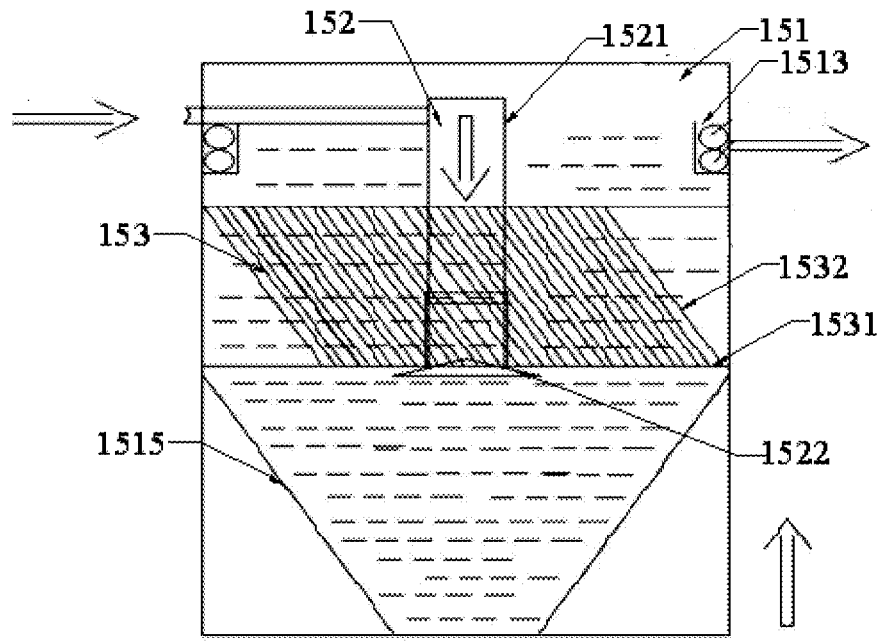
FIG. 5 is a structural schematic diagram of the water advanced treatment device arranged on the settling zone in the FIG. 1 of the preferred embodiment of the present invention.

As shown in the FIG. 5, the advanced treatment zone 15 is provided with the water advanced treatment device for advanced treatment on sewage. The effluent treated by the water advanced treatment device can reach an effluent standard A of first grade of national standard. The water advanced treatment device includes the box body 151, the vertical flow settling assembly 152 and the inclined tube settling assembly 153, and the vertical flow settling assembly 152 and the inclined tube settling assembly 153 are received in the box body 151. The box body 151 is of a closed structure and only communicates with outer side via the water inlet and the water outlet. Specifically, the water inlet and the water outlet are formed in an upper side wall of the box body 151. The water inlet pipe extends into the box body 151 via the water inlet to communicate with the vertical flow settling assembly 152, the vertical flow settling assembly 152 is located in a position of a center axis of the box body 151 and is vertically arranged, and two ends of the vertical flow settling assembly 152 penetrates through the inclined tube settling assembly 153 respectively. The vertical flow settling assembly 152 is used for vertically guiding fluid introduced from the water inlet and outputting the fluid in an ejecting manner by way of inclined wall reflection the inclined tube settling assembly 153 is arranged in an output position of the vertical flow settling assembly 152 and used for settling the fluid output by the vertical flow settling assembly 152 in an inclined settling manner. The inclined tube settling assembly 153 divides a water body into a series of shallow settling layer, and the treated water body and settled sludge move and are separated mutually in each settling shallow layer, so that the inclined tube settling assembly has the advantages of large settling area, high settling efficiency, short settling time and the like. The inner wall of the box body 151 is provided with a ring of water channel 1513, the bottom position of the water channel 1513 is lower than the position of the water outlet, the water outlet pipe communicates with the water outlet, and only can a clean liquid in the uppermost layer settled flow into the water channel 1513 to be discharged via the water discharge pipe, such that it is ensured that the water advanced treatment device has a good settling treatment effect. The water advanced treatment device of the present invention laminates and combines vertical flow settling with inclined tube settling, such that the structural space is saved, and therefore, the whole apparatus is more integrated and miniaturized. It can be understood that as a deformation, the vertical flow settling assembly 152 can be further arranged on one side in the box body 151 and catapult the water flow to the other side via the sloping plate.

The vertical flow settling assembly 152 comprises the center barrel 1521 and the rebounding piece 1522 connected with each other, the upper end of the center barrel 1521 can be either closed or opened, the upper portion of the center barrel 1521 communicates with the water inlet pipe, and the rebounding piece 1522 is arranged at the lower end of the center barrel 1521 and is located below the inclined tube settling assembly 153. Sewage introduced from the water inlet pipe passes through the center barrel 1521 and is catapulted to an inclined wall of the inclined tube settling assembly 153 via the rebounding piece 1522 after a freely falling body motion, such that preliminary sludge and sewage separation is achieved. It can be understood that the rebounding piece 1522 is provided with at least one bevel located in a falling direction of sewage. Preferably, the rebounding piece 1522 is isosceles triangle-shaped, and the two waists thereof play a catapulting role on the sewage in freely falling body motion. It can be further understood that the center barrel 1521 can be fixed via a fixed bar (not shown in the drawing), and one end of the fixed bar is connected with the central barrel 1521 while the other end of the fixed bar is connected with the inner wall of the box body 151. In order to guarantee a stable position of the central barrel 1521, preferably, a plurality of fixed bars are circumferentially arranged on the inner wall of the box body 151. It can be further understood that the central barrel 1521 and the rebounding piece 1522 are connected via two connecting rods, and the connecting rods are preferably L-shaped. An inclination angle of the bevel of the rebounding piece 1522 is 10-45 degrees, preferably 10-20 degrees. When the inclination angle of the bevel of the rebounding piece is within the range, the sewage in freely falling body motion in the central barrel 1521 can be uniformly rebounded to the inclined wall of the inclined tube settling assembly 153, such that a preliminary sludge and sewage separation effect is the best. It can be understood that the rebounding piece 1522 further can be an inclined plate, a conical plate or a cone-shaped plate. It can be further understood that the inclination angle of the bevel of the rebounding piece 1522 can be adjusted and the angle of the water flow falling in the central barrel 1521 to the rebounding piece 1522 can be adjusted by adjusting the inclination angle of the bevel of the rebounding piece 1522, so that the rebounding angle of the water flow is further adjusted, and therefore, vertical flow settlement and inclined tube settlement are combined perfectly, thereby ensuring a good settling effect.

It can be understood that as a deformation, an axial length of the center barrel 1521 can be adjusted. Specifically, the center barrel 1521 is of a retractable structure formed by connecting a plurality of barrel bodies. Adjacent two barrel bodies can slide relatively along an axial direction to be positioned, such that the axial length of the center barrel 1521 can be adjusted. The water inlet amount and the height position of the water outlet can be adjusted by adjusting the axial length of the center barrel 1521 with quite convenient operation. An impact force of the water flow in freely falling body motion in the center barrel 1521 to the rebounding piece 1522 can be adjusted by adjusting the height position of the water outlet, such that vertical flow settlement and inclined tube settlement can be combined perfectly. It can be understood that as the height of the center barrel 1521 can be further adjusted. Specifically, the top of the center barrel 1521 is connected with an upper inner wall of the box body 151 via a liftable mechanism, and the height of the center barrel 1521 is adjusted by controlling lift of the lifting mechanism, so that the height positron of the water outlet is further adjusted, and therefore, vertical flow settlement and inclined tube settlement can be combined perfectly.

It can be understood that as a deformation, a separation distance between the center barrel 1521 and the rebounding piece 1522 can be adjusted. Specifically, the outer wall surface of the center barrel 1521 is uniformly provided with a plurality of bayonets at intervals, two connecting rods fixedly connected with the rebounding piece 1522 are clamped into the bayonets on the outer wall surface of the center barrel 1521, and the distance between the rebounding piece 1522 and the center barrel 1521 is adjusted by selecting the positions of the bayonets. The impact force of the water flow in freely falling body motion in the center barrel 1521 to the rebounding piece 1522 can be adjusted by adjusting the separation distance between the center barrel 1521 and the rebounding piece 1522, such that the angle of catapulting the water flow by the rebounding piece 1522 is further adjusted to achieve perfect combination of vertical flow settlement and inclined tube settlement.

Figure 6:
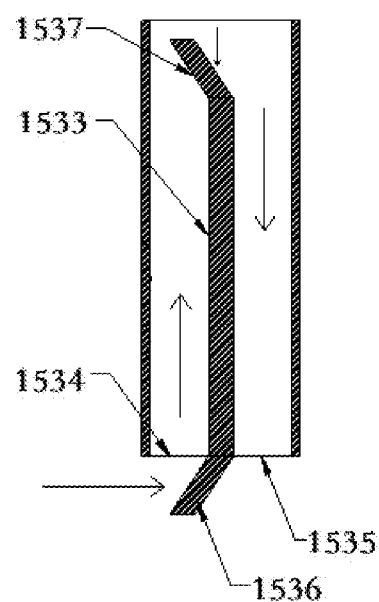
FIG. 6 is a schematic diagram of an internal structure of the inclined tube in the FIG. 5 of the preferred embodiment of the present invention.

The inclined tube settling assembly 153 includes at least two supporting pipes 1531 and a plurality of inclined tubes 1532 arranged in parallel, the at least two supporting pipes 1531 are fixedly connected with the inner wall of the box body 151 and the plurality inclined tubes 1532 are fixed via the at least two supporting pipes 1531. The inclination angel of the inclined tubes 1532 is 50-70 degrees, preferably 55-60 degrees. When the inclination angel of the inclined tubes 1532 is within the range, the inclined tube settling assembly 153 has the best settling effect. Preferably, the number of the supporting pipes 1531 is two, and one ends of the plurality of inclined tubes 1532 arranged in parallel are connected with one of the supporting pipes 1531 while the other ends of the plurality of inclined tubes are connected with the other supporting pipe 1531. It can be understood that the supporting pipe 1531 is horizontally arranged preferably, and the inclined tube settling assembly 153 is more stable in structure. It can be understood that preferably, the inclined tube 1532 is internally provided with honeycomb filler, such that the settling effect is further improved. It can be understood that the water inlet in the lower end of the inclined tube 1532 and the water outlet in the upper end of the inclined tube can be sealed and adjusted, and specifically, closing degrees of the water inlet in the lower end of the inclined tube 1532 and the water outlet in the upper end of the inclined tube are adjusted by a sealing plate. It can be understood that the inclination angle of the inclined tube 1532 can be adjusted and specifically, the lower end of the inclined tube 1532 is fixedly connected with the supporting pipe 1531, and the upper end of the inclined tube 1532 is movably connected with the supporting pipe 1531; or the upper end of the inclined tube 1532 is movably connected with the supporting pipe 1531 and the upper end of the inclined tube 1532 is fixedly connected with the supporting pipe 1531. The silt deposition speed in the inclined tube 1532 can be adjusted by adjusting the inclination angel of the inclined tube 1532, so that the settling treatment speed is accelerated. It can be further understood that as a deformation, as shown in FIG. 6, the water inlet in the lower end of the inclined tube 1532 is internally provided with a partition plate 1533 along an axial direction of the inclined tube, and the partition plate 1533 divides the water inlet of the inclined tube 1532 into the upper flow port 1534 and the lower flow port 1535, the water inlet of the inclined tube 1532 is further provided with a lower guide plate 1536, such that the water flow flowing from the vertical flow settling assembly 152 flows into the inclined tube 1532 from the upper flow port 1534 after being guided by the lower guide plate 1536, and in addition, the end of the partition plate 1533 far away from the water inlet is further provided with an upper guide plate 1537, such that settled silt flows out of the inclined tube 1532 from the lower flow port 1535 along the upper guide plate 1537, and therefore, the water flow entering the inclined tube 1532 flows separated from the settled silt flowing out of the inclined tube 1532 to prevent the ascending water flow from bringing the settled silt to the water outlet in the upper end of the inclined tube 1532 again, thereby improving the settling efficiency and the settling effect. It can be further understood that as a deformation, the inclined tube settling assembly 153 can lift integrally relative to the center barrel 1521 along the axial direction, and specifically, two inner side walls of the box body 151 are symmetrically provided with a plurality of groups of bayonets, two ends of the supporting pipe 1531 can be clamped into the bayonets on the two side walls respectively, and the height position of the supporting pipe 1531 can be adjusted by selecting the positions of the bayonets for clamping, such that the height position of the inclined tube 1532 can be adjusted. The angle of the water flow output by the vertical flow settling assembly 152 and catapulted to the inclined wall of the inclined tube settling assembly 153 can be adjusted by adjusting the height position of the inclined tube settling assembly 153 to ensure that preliminary silt and water separation has the best separation effect.

It can be understood that as a deformation, the inclined tube settling assembly 153 in the present invention can be further replaced by a sloping plate settling assembly, sewage is settled and separated in a separation distance between the sloping plate and the sloping plate, and the inclined tube settling assembly 153 and the sloping plate settling assembly adopt inclined settling modes.

Preferably, in order to further improve the sewage treatment effect of the water advanced treatment device, the water advanced treatment device further includes the sand filter layer and/or carbon filter layer arranged in the water channel 1513, and the sand filter layer and/or carbon filter layer filters the water flow in the next step, thereby further improving the sewage treatment effect. The sand filter layer can further remove particulate matters in the sewage, and the carbon filter layer can further adsorb grease in the sewage. Preferably, a water inlet surface of the sand filter layer and/or the carbon filter layer inclines toward an inner cavity of the box body 151, such that filtered impurities subjected to gravity and a washing force of the water flow are returned to the box body 151 to be settled, such that a self-cleaning function of the sand filter layer and/or the carbon filter layer is achieved. It can be understood that as a deformation, the sand filter layer and/or the carbon filter layer can be directly arranged at the water outlet of the box body 151.

Preferably, the inner wall of the lower portion of the box body 151 is provided with a slope 1515, settled sludge slides to the bottom of the box body 151 along the surface of the slope 1515, and by arranging the slope 1515, the sludge settling speed is accelerated and the sludge settling treatment speed is increased. The inclination angle of the slope 1515 is 50-70 degrees, preferably 55-65 degrees. Further, preferably, the bottom of the box body 151 is provided with a sludge discharge port (not shown in the drawing) in a sludge settling region so as to discharge sludge in the box body 151 periodically.

It can be understood that preferably, the water channel 1513 can slide up and down relative to the inner wall of the box body 151, such that a water outlet flow at the water outlet can be adjusted by adjusting the position of the water channel 1513 according to a real-time water level in the box body 151. The water channel 1513 capable of sliding up and down relative to the inner wall of the box body 151 can be structured such that the outer wall of the water channel 1513 is provided with the protrusion, the inner wall of the box body 151 is provided with the groove, and the water channel and the box body slide relatively via the protrusion and the groove. In addition, the groove is internally provided with the plurality of positioning salient points uniformly at intervals along a vertical direction, and the water channel 1513 is positioned via the positioning salient points. It can be further understood that the protrusion can be arranged on the inner wall of the box body 151 and the groove is formed in the outer wall of the water channel 1513.

According to the water advanced treatment device, the sewage is introduced into the center barrel 1521 via the water inlet pipe, conducts a freely falling body motion in the center barrel 1521 and is rebounded to the inclined wall of the inclined tube 1532 via the rebounding piece 1522 to achieve preliminary sludge and sewage separation. The flow rate of the sewage in the box body 151 can be reduced, such that the sewage ascends slowly in the box body 151. The ascending direction of the water flow in the box body 151 is opposite to the settling direction of the particles, and the particles with the ascending speed equal to the settling speed will form a suspension layer in the box body 151, such that the ascending particles are intercepted and filtered, the particles fall onto the bottom of the box body 151 after being settled, a supernate after settling treatment is buffered and transitioned via the water channel 1513 and is then discharged by the water outlet pipe after being finally filtered and screened by the sand filter layer and/or the carbon filter layer in the water channel 1513. The water advanced treatment device of the present invention combines vertical flow settlement with inclined tube settlement and has the advantages of reasonable arrangement form, high impact load resistance and good settling treatment effect, and a concentration of suspended solids of the effluent can reach a type A discharge standard of grade one of national standard.

Figure 7:
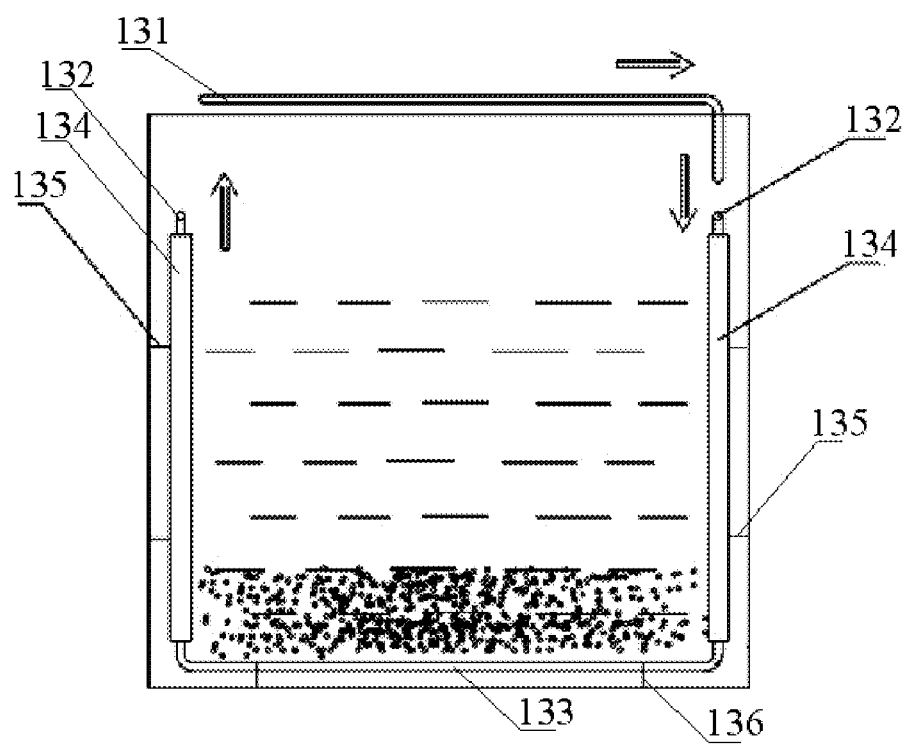
FIG. 7 is a schematic diagram of the aeration device arranged in the aerobic zone in the FIG. 1 of the preferred embodiment of the present invention.

As shown in the FIG. 7, the aerobic zone is internally provided with the aeration device for increasing concentration of dissolved oxygen in the aerobic zone 13. The aeration device includes an aeration main pipe 131, an aeration branch pipe 132, an aeration hose 133, a sleeve 134 and a fixed bracket 135, wherein the aeration main pipe 131 is arranged on two sides of the aerobic zone 13, the aeration hose 133 is arranged at the bottom of the aerobic zone 13, and the aeration hose 133 plays an aerating role. It can be understood that the aeration hose 133 has the characteristics of thin wall and straight channel and can reduce the loss of aerating resistance to a great extent. Aeration holes in the aeration hose are slit shaped, and the widths of the slits are variable, so that a problem that an existing aeration head is easily blocked is solved. The aeration head aerates uniformly, can form a vertical ring current, and is small in generated bubble and high in oxygen utilization ratio. The aeration main pipe 131 communicates with the fan of the apparatus zone, the fixed bracket 135 is fixedly connected with the inner side wall of the aerobic zone 13, the sleeve 134 is fixedly connected with the fixed bracket 135, the sleeve 134 is vertically arranged or obliquely arranged, i.e., the sleeve 134 is perpendicularly arranged or vertically and obliquely arranged, one end of the aeration branch pipe 132 is detachably connected with the aeration main pipe 131, and the other end of the aeration branch pipe 132 penetrates through the sleeve 134 and is detachably connected with the aeration hose 133 at the bottom of the aerobic zone 13. It can be understood that the fixed bracket 135 and the sleeve 134 are arranged on each of opposite two side walls of the aerobic zone 13, and the aeration branch pipe 132 penetrates through the sleeve 134 and is detachably connected with two ends of the aeration hose 133 respectively. It can understood that the detachable connection mode can be hoop connection and quick connector connection, or one of two connected pipes is provided with a connector of an internal thread structure and the other is provided with a connector with an external thread structure, i.e., the two are connected by thread fit. It can be understood that the aeration main pipe 131 is divided into an air inlet main pipe and an air outlet main pipe, the air inlet main pipe communicates with the fan and the air inlet main pipe is connected with the aeration branch pipe 132 on one side of the aerobic zone 13, the aeration branch pipe 132 on the other side of the aerobic zone 13 communicates with the air outlet main pipe, and air conveyed by the fan circulates in the aerobic zone 13 via the air inlet main pipe, the aeration branch pipe 132 and the aeration hose 133 on one side and the aeration branch pipe 132 and the air outlet main pipe on the other side. It can be understood that the aeration branch pipe 132 is a hose, and the aeration branch pipe 132 and the aeration hose 133 are made from PU or soft PVC. It can be understood that as the aeration branch pipe 132 is the hose, the aeration branch pipe is easy to float when air is introduced into the aeration branch pipe. The aeration branch pipe 132 is limited by the sleeve 134, and the aeration branch pipe 132 vertically arranged can be limited, so that the aeration branch pipe does not swing left and right. In addition, the sleeve 134 further can limit the aeration hose 133 to float upward to a great extent. It can be understood that a plurality of aeration hoses 133 are arranged uniformly at intervals at the bottom of the aerobic zone 13 to ensure uniform aeration. The aeration branch pipes 132 can be arranged in one-to-one correspondence to the aeration hoses 133 or one aeration branch pipe 132 communicates with the aeration hoses 133 via branch pipes respectively. It can be understood that as a deformation, the aeration branch pipe 132 and the aeration hose 133 can be an integrated hose too. It can be further understood that as a deformation, the fixed bracket 135 can be omitted, and the sleeve 134 is fixedly arranged on the inner wall of the aerobic zone 13 directly.

According to the aeration device, when it is needed to replace the aeration hose 133, it is only needed to detach the aeration branch pipe 132 and the aeration main pipe 131 on one side and then to connect the aeration branch pipe 132 with a newly replaced aeration hose 133, and to detach the aeration branch pipe 132 and the aeration main pipe 131 on the other side. The aeration branch pipe 132 is pulled upward uniformly energetically from one end to pull out the aeration hose 133 from the bottom of the aerobic zone 13 along the sleeve 134, and the sleeve 134 plays an important limiting role. Then the newly replaced aeration hose 133 is connected with the aeration branch pipe 132, and then the aeration branch pipe 132 is connected with the aeration main pipe 131, and the aeration hose 133 is replaced without shutdown. It is not needed to swab off water in the apparatus, so that it is quite convenient to replace or maintain.

It can be understood that preferably, sealing structures are arranged in a detachable connecting position of the aeration main pipe 131 and the aeration branch pipe 132 and a detachable connecting position of the aeration branch pipe 132 and the aeration hose 133, and the sealing structures can be seal rings, sealants, waterstop rings, a male and female slot seal fit or a mortise joint fit.

It can be understood that preferably, the aeration device further includes the support frame 136 arranged at the bottom of the aerobic zone 13 and used for supporting the aeration hose 133. The support frame 136 is fixedly arranged at the bottom of the aerobic zone 13 via bolts, the aeration hoses 133 are erected on the support frame 136, and the plurality of aeration hoses are uniformly arranged at intervals, such that the aeration hose 133 can be supported uniformly well. Further, preferably, the support frame 136 has a protecting structure when the aeration hose 133 is replaced. The protecting structure can be structured such that a flexible pad is arranged at an inlet-outlet position of the support frame 136, or a flexible layer is arranged on the surfaces of the support frame 136 and the aeration hose 133, or a contact surface of the support frame 136 and the aeration hose 133 is a cone-shaped surface or a cambered surface, or a part in contact with the support frame 136 and the aeration hose 133 is provided with a roller, a ball or a pin roll to achieve rolling contact therebetween.

It can be understood that as a deformation, the aeration device further includes a limiting piece (not shown in the drawing) fixedly arranged at the bottom of the aerobic zone 13 and used for limiting the aeration hose 133. The limiting piece is fixedly arranged at the bottom of the aerobic zone 13 through screws or bolts, and the limiting piece is provided with a through hole where the aeration hose 133 passes through. As the aeration hose 133 is made from a soft material, the aeration hose is easy to float when air is introduced into the aeration hose, and the limiting piece can limit the aeration hose 133 well, such that the aeration hose 133 is substantially horizontal at the bottom of the aerobic zone 13 and meanwhile, it ensured that air bubbles generated by the aeration hose 133 are in a vertical ascent state substantially and are more uniform to aerate. It can be understood that a plurality of limiting pieces are arranged uniformly at intervals at the bottom of the aerobic zone 13.

It can be further understood that preferably, a fixed position of the fixed bracket 135 can be adjusted on the inner wall of the aerobic zone 13. In particular, the inner wall of the aerobic zone 13 is uniformly provided with a plurality of threaded holes at intervals, the fixed bracket 135 is fastened to the inner wall of the aerobic zone 13 via screws, and a vertical height of the fixed bracket 135 can be adjusted by selecting positions of the threaded holes, such that a horizontal height of the aeration hose 133 can be further adjusted and it is convenient to adjust the height position of the aeration hose 133 according to an actual need. Or, the inner wall of the aerobic zone 13 is vertically provided with a sliding groove, the sliding groove is internally provided with a plurality of positioning salient points at intervals, the fixed bracket 135 is provided with a protrusion, can slide up and down in the sliding groove and is positioned via the positioning salient points in the sliding groove, such that it is quite convenient to adjust the height position of the fixed bracket 135, thereby adjusting the height position of the aeration hose 133.

It can be understood that preferably, the aeration device further includes a sleeving bend (not shown in the drawing) arranged at a connecting position of the aeration branch pipe 132 and the aeration hose 133, one end of the sleeving bend is connected with a sleeve 134 and the end of the aeration hose 133 connected with the aeration branch pipe 132 is located in the sleeving bend. When it is needed to replace the aeration hose 133, the aeration branch pipe 132 is pulled energetically upwards to pull out the aeration hose 133 from the sleeve 134. As the sleeve 134 is arranged vertically or obliquely and the aeration hose 133 is arranged horizontally substantially, the bottom of the sleeve 134 is easy to scratch the aeration hose 133 when the aeration hose 133 is pulled. The aeration hose 133 can be prevented from being scratched as the sleeving bend arranged at a connecting position of the aeration branch pipe 132 and the aeration hose 133. Further, preferably, an inner surface of the sleeving bend is provided with a flexible layer or an inlet-outlet of the sleeving bend is provided with a flexible pad or a surface of the sleeving bend in contact with the aeration hose 133 is a circular conical surface or an arc surface.

The sewage treatment apparatus suitable for single-household domestic sewage treatment of the present invention, a treatment object is common household sewage, wherein the COD of influent is 200-300 mg/L, the BOD is 100-120 mg/L, the SS is 80-100 mg/L, the content of ammonia nitrogen is 20-25 mg/L and the content of total phosphorus is 1-3 mg/L. The effluent quality after treatment by the sewage treatment apparatus can meet a first grade standard A of Pollutant Discharge Standard of Municipal Sewage Treatment Plant GB18918-2002, wherein the COD of effluent is 50 mg/L, the BOD is 10 mg/L, the SS is 10 mg/L, the content of ammonia nitrogen is 5 (8) mg/L and the content of total phosphorus is 0.5 mg/L.

The foregoing is merely illustrative of the preferred embodiments of the present invention and is not intended to be limiting of the present invention, and for those skilled in the art, the present invention may have various changes and modifications. Any modification, equivalent replacement, improvement, etc. made within the spirit and principle of the present invention shall be regarded as within the protection scope of the present invention.

The invention claimed is:

1. A sewage treatment apparatus suitable for single-household domestic sewage treatment, the sewage treatment apparatus being used for integrated treatment of domestic sewage discharged by a single residence, and comprising:
a pneumatic lifting apparatus for lifting domestic sewage;
an external box body, wherein the external box body is internally provided with a screen zone,
an anaerobic and anoxic zone, an aerobic zone, a settling zone, an advanced treatment zone and a disinfection and sterilization zone communicating in sequence, the screen zone communicates with a household septic-tank through the pneumatic lifting apparatus, the aerobic zone communicates with the anaerobic and anoxic zone to reflux a part of mixed liquid to an anaerobic zone of the anaerobic and anoxic zone, and the settling zone communicates with the anaerobic and anoxic zone to reflux a part of active sludge to an anoxic zone of the anaerobic and anoxic zone; and
an apparatus zone arranged independently and separately, wherein the apparatus zone is internally provided with an air compressor for providing a conveying pressure;
the advanced treatment zone is provided with a water advanced treatment apparatus, wherein the water advanced treatment apparatus comprises a box body, an upper portion of the box body is provided with a water inlet and a water outlet; and the box body is internally provided with a vertical flow settling assembly for guiding a fluid vertically introduced from the water inlet and outputting the fluid in an ejecting manner by way of inclined wall reflection and an inclined tube settling assembly arranged in an output position of the vertical flow settling assembly and used for settling the fluid output by the vertical flow settling assembly in an inclined settling manner;
the vertical flow settling assembly comprises a center barrel and a rebounding piece connected with each other; the water flow is introduced into an upper portion of the center barrel and the rebounding piece is arranged at a lower end of the center barrel and is located below the inclined tube settling assembly; and the rebounding piece is provided with at least one bevel located in a water flow falling direction; wherein the vertical flow settling assembly is configured to allow a sewage to pass through the center barrel and captured at an inclined wall of the inclined tube settling assembly via an inclined surface of the rebounding piece after a freely falling body motion, to achieve a preliminary sludge and sewage separation;
the inclined tube settling assembly comprises at least two supporting pipes and a plurality of inclined tubes arranged in parallel; and the at least two supporting pipes are in fastening connection with an inner wall of the box body, and the plurality of inclined tubes are positioned in the box body through the at least two supporting pipes; and
a water inlet at a lower end of the inclined tube is provided with a partition plate for dividing the water inlet into an upper flow port and a lower flow port, the water inlet at the lower end of the inclined tube is further provided with a lower guide plate for guiding the water flow to flow into the inclined tube from the upper flow port, and an upper end of the partition plate is provided with an upper guide plate for guiding separated silt to flow out from the lower flow port, such that the water flow entering the inclined tube flows separated from the settled silt flowing out of the inclined tube to prevent the ascending water flow from bringing the settled silt to the water outlet in the upper end of the inclined tube again.

2. The sewage treatment apparatus according to claim 1, wherein
the screen zone is internally provided with a drawer type screen, the drawer type screen is a drawer box spliced by four side plates and a bottom plate and provided with an opening; and
the bottom plate is provided with an intercepting hole for intercepting a suspended state pollutant and a colloidal pollutant, a bore diameter of the intercepting hole is 1-10 mm.

3. The sewage treatment apparatus according to claim 1, wherein
a top of the anaerobic zone of the anaerobic and anoxic zone is provided with a deodorization device, the deodorization device comprises a shell, a protecting layer for preventing water in the anaerobic zone from entering the shell, a physical adsorption layer for physically adsorbing odor floating upwards in the anaerobic zone, a heating assembly for thermal desorption and regeneration of the physical adsorption layer and an exhaust valve for discharging gas adsorbed by the physical adsorption layer to an atmosphere; and the shell is hermetically connected with the anaerobic zone, a bottom of the shell is provided with a ventilating channel, the protecting layer and the physical adsorption layer are received in the shell, the protecting layer is located at the bottom of the shell, the physical adsorption layer is located above the protecting layer, and the exhaust valve is arranged on a top of the shell.

4. The sewage treatment apparatus according to claim 1, wherein the settling zone is provided with a water distributing apparatus for distributing water uniformly, and the water distributing apparatus comprises a water guide pipe perpendicularly arranged or vertically and obliquely arranged for introducing a water flow into a bottom of the settling zone and a water distributing pipe located in the bottom of the settling zone and horizontally arranged for distributing water uniformly;

an upper end of the water guide pipe communicates with a water inlet pipeline, and a lower end of the water guide pipe communicates with the water distributing pipe; and the water distributing pipe is uniformly provided with a plurality of water distributing holes that are spaced from each other uniformly, and separation distance between adjacent water distributing holes is 20-100 mm.

5. The sewage treatment apparatus according to claim 1, wherein the water outlet of the box body is provided with a sand filter layer and/or a carbon filter layer;

or an inner wall surface of an upper portion of the box body is provided with a ring of water channel, the water channel is internally provided with the sand filter layer/or the carbon filter layer, and a bottom position of the water channel is lower than the position of the water outlet.

6. The sewage treatment apparatus according to claim 1, wherein the disinfection and sterilization zone is internally provided with an ultraviolet disinfector and/or an ozone sterilizer.

* * * * *